United States Patent
Brahmadevara et al.

(10) Patent No.: US 9,930,161 B1
(45) Date of Patent: Mar. 27, 2018

(54) SYSTEM AND METHOD OF CACHING TARGETED INTERNET PROTOCOL (IP) NOTIFICATIONS TO MOBILE COMMUNICATION DEVICES

(71) Applicant: Sprint Communications Company L.P., Overland Park, KS (US)

(72) Inventors: Phaneendra Brahmadevara, Overland Park, KS (US); Matthew Habiger, Kansas City, KS (US); Jared K. Harpole, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/415,730

(22) Filed: Jan. 25, 2017

(51) Int. Cl.
| | |
|---|---|
| H04M 1/725 | (2006.01) |
| H04W 4/12 | (2009.01) |
| H04W 4/02 | (2018.01) |
| H04L 29/08 | (2006.01) |
| H04W 8/18 | (2009.01) |
| H04W 4/00 | (2009.01) |
| H04M 1/00 | (2006.01) |

(52) U.S. Cl.
CPC .... H04M 1/72519 (2013.01); H04L 67/2842 (2013.01); H04W 4/025 (2013.01); H04W 4/12 (2013.01); H04W 8/183 (2013.01)

(58) Field of Classification Search
CPC .......... H04M 1/72519; H04L 67/2842; H04W 4/025; H04W 4/12; H04W 8/183

USPC .......................................................... 455/466
See application file for complete search history.

(56) References Cited

U.S. PATENT DOCUMENTS 9,288,627 B2 * 3/2016 Irish ...................... H04W 4/025

OTHER PUBLICATIONS

Habiger, Matthew, et al., "System and Method of Targeting Internet Protocol (IP) Notifications to Mobile Communication Devices," filed Oct. 24, 2016, U.S. Appl. No. 15/332,808.

* cited by examiner

Primary Examiner — Huy C Ho

(57) ABSTRACT

A mobile communication device. The device comprises a radio transceiver, a display, a non-transitory memory, a processor, and a notification application stored in the non-transitory memory. When executed by the processor the notification application receives a plurality of notification bundles via the radio transceiver, where each notification bundle comprises a notification and a trigger rule and each notification comprises a prompt to download and install a mobile application on the mobile communication device. The notification application when executed further stores the notification associated with each of the notification bundles in the non-transitory memory, monitors a context of the device, evaluates each of the trigger rules of the notification bundles based on monitoring the context of the device, and when a trigger rule evaluates to be active, presenting the notification associated with the active trigger rule in the display.

18 Claims, 7 Drawing Sheets

SYSTEM AND METHOD OF CACHING TARGETED INTERNET PROTOCOL (IP) NOTIFICATIONS TO MOBILE COMMUNICATION DEVICES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices may be capable of downloading and installing mobile applications after initial purchase and activation. For example, a user of a mobile phone may download a streaming music application or a gaming application to his or her mobile phone via a wireless connection to the Internet. The user may pay for the right to download and install the mobile application. Alternatively, or in addition, the mobile application developer may obtain revenue indirectly from the installation of the mobile application on the user's mobile phone, for example through advertising revenue.

Internet protocol (IP) notifications may be sent to mobile phones that are unsolicited or un-triggered by the mobile phones. An application on the mobile phone may be installed by an original equipment manufacturer (OEM) of the mobile phone that receives and processes IP notifications. The application may post the notifications or a concise summary or headline associated with the notifications to a notifications area of a user interface of the mobile phone. A user may look at the notifications, click or touch a notification summary of one of the notifications, and the application may then present more complete and fuller information related to the notification in a window of a display of the mobile phone. The fuller notification information may, in some cases, comprise a link or reference to other content that may be downloaded conveniently across the Internet to the mobile phone by touching or clicking on the link.

SUMMARY

In an embodiment, a mobile communication device is disclosed. The device comprises a radio transceiver, a display, a non-transitory memory, a processor, and a notification application stored in the non-transitory memory. When executed by the processor the notification application receives a plurality of notification bundles via the radio transceiver, where each notification bundle comprises a notification and a trigger rule and each notification comprises a prompt to download and install a mobile application on the mobile communication device. The notification application when executed further stores the notification associated with each of the notification bundles in the non-transitory memory, monitors a context of the device, evaluates each of the trigger rules of the notification bundles based on monitoring the context of the device, and when a trigger rule evaluates to be active, presenting the notification associated with the active trigger rule in the display.

In another embodiment, a method of presenting notifications on a mobile communication device is disclosed. The method comprises receiving a plurality of notification bundles by a radio transceiver of the mobile communication device, where each notification bundle comprises a notification and an associated trigger rule that describes a context of the mobile communication device in which the notification is to be presented, storing the plurality of notifications in a non-transitory memory of the mobile communication device, receiving a non-cached notification via the radio transceiver, and presenting the non-cached notification on a display of the mobile communication device. The method further comprises monitoring the context of the mobile communication device by a notification application executing on the mobile communication device, where the context comprises at least three of a location of the mobile communication device, a current time, a current date, a current day of the week, an identity of a mobile application executing on the mobile communication device, and a cellular wireless service connectivity of the mobile communication device, evaluating each of the trigger rules associated with the received notification bundles by the notification application based on the context, when a trigger rule evaluates to be active, presenting the notification associated with the active trigger rule on the display of the mobile communication device, and transmitting a log documenting the event of presenting the notification by the notification application to a notification server via the radio transceiver, whereby the notification server can modulate the number of non-cached notifications it sends to the mobile communication device per day.

In yet another embodiment, a method of sending notifications to mobile communication devices is disclosed. The method comprises receiving by an application executing on a computer logs documenting events of presenting notifications cached on mobile communication devices in response to trigger rules evaluating active on the devices, analyzing the logs by the application in combination with profiles of subscribers associated with the logs, creating a first triggering rule by the application for a first notification based on analyzing the logs in combination with a first set of profiles of subscribers, creating a second triggering rule by the application for the first notification based on analyzing the logs in combination with a second set of profiles of subscribers, sending out a first notification bundle by the application to a first plurality of mobile communication devices associated with subscribers that have profiles that correlate with the first set of profiles, where the first notification bundle comprises the first notification and the first triggering rules, sending out a second notification bundle by the application to a second plurality of mobile communication devices associated with subscribers that have profiles that correlate with the second set of profiles, where the second notification bundle comprises the first notification and the second triggering rule.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief descrip

DETAILED DESCRIPTION

Figure 1:
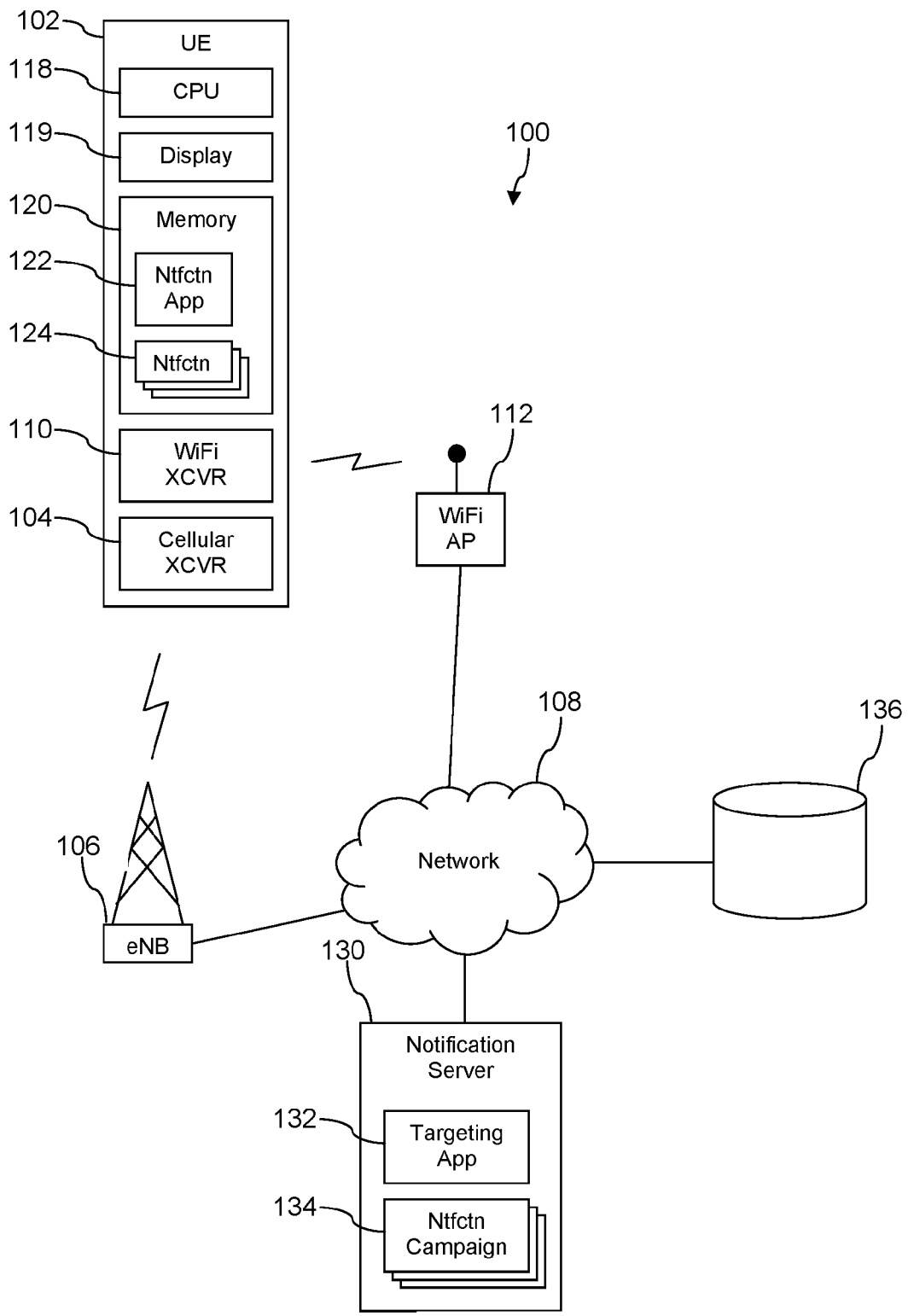
- FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system for caching targeted Internet protocol (IP) notifications on a user equipment (UE), such as on a smart phone or other mobile communication device. IP notifications may be sent from a communication network to the UE via a cellular radio access network (RAN) and may comprise a variety of information including public interest announcements such as weather alerts and Amber alerts, wireless service messages such as messages about available application updates and maintenance release (MR) availability, and promotional notifications. Some IP notifications may be selected for a specific UE, or subscriber associated with the UE, based on an estimation of the interest of the subscriber in the content of the IP notification. These selected IP notifications may be referred to as targeted IP notifications because they are targeted at or aimed at a particular kind of wireless communication service subscriber among all subscribers, such as a young subscriber, a male subscriber, or a subscriber with a demonstrated interest in action gaming mobile applications. While IP notifications are described herein, one skilled in the art will appreciate that the teachings may be readily extended to other mobile communication device notification frameworks other than IP notifications.

Conventionally, IP notifications are presented in a notifications screen of the UE at the time each notification is received, without significant delay. The present disclosure teaches caching or storing some IP notifications in a memory of the UE for presentation after a delay and in response to a context of the UE satisfying a triggering rule sent with the IP notification by the network to the UE. This kind of IP notification may be referred to as a cached IP notification. This kind of IP notification may be transmitted from the cellular RAN to the UE as a notification bundle that comprises the IP notification and an associated triggering rule. The triggering rule may be evaluated by an IP notification application that executes on the UE to monitor the context of the UE and to determine when the context of the UE satisfies the triggering rule. When the IP notification application determines that the context of the UE does satisfy the triggering rule, the IP notification application retrieves the associated IP notification from the memory where it was stored or cached and presents the IP notification in the notifications screen of the UE.

The context of the UE evaluated by the triggering rules may comprise one or more of a location of the UE, a time of day, a day of the week, a date, an installation of a specific mobile application on the UE, an initiation or start-up of an application on the UE, an event of receiving a specific input on the UE, a state transition of the UE such as transitioning to airplane mode, an event of transitioning from receiving wireless coverage from the cellular RAN to receiving wireless coverage from a WiFi access point (AP), or other event. The triggering rules may be defined to evaluate a single contextual parameter or a combination of contextual parameters. The triggering rules may define a state machine, for example a trigger evaluation may depend on a sequence of context parameter values not on the current value of one or more context parameters alone.

The IP notification application may also receive non-cached IP notifications and present them in the notifications screen without any significant delay (e.g., substantially immediate presentation). The IP notification application may count the number of IP notifications that are presented in the notifications screen during a time period, for example during a day, and restrict triggering of cached IP notifications if presenting the triggered cached IP notification would result in presenting more than a predefined number of IP notifications per time period. For example, if the predefined daily limit of IP notifications for the UE is five IP notifications and if the daily five IP notifications have already been presented by the UE, the IP notification application may not present a cached IP notification in the remainder of that day even if the IP notification application determines that the associated triggering rule is satisfied by the context of the UE. In some contexts a triggering rule that is determined to be satisfied by the context of the UE may be referred to as being active or evaluating to be active. The restriction to a predefined number of IP notifications per period of time may be considered to be a part of the trigger rules. The count of IP notifications presented per period of time may be considered a context parameter of the UE, and the restriction of IP notifications per time period may be explicitly defined in each triggering rule. Alternatively, the IP notification application may evaluate the count of IP notifications presented per period of time independently of evaluating specific triggering rules. For example, if the IP notification application determines that the maximum number allowed of IP notifications have already been presented in the current time period, the IP notification application may discontinue evaluating specific triggering rules until the current time period is concluded.

The IP notification application may send messages to an IP notification server in the network when it presents a cached IP notification (e.g., on the event that a context of the UE triggers presentation of a cached IP notification) to notify the IP notification server. The IP notification server may count the number of IP notifications have been presented on the UE per period of time and limit non-cached IP notifications that it sends to the UE accordingly. Thus, for example, if the IP notification server knows that the UE has already presented five IP notifications during the current period of time, the IP notification server may avert sending additional non-cached IP notifications to the UE during the current period of time. When this periodic limit has been exceeded, however, the IP notification server may still send cached IP notifications (e.g., in the form of IP notification bundles) to the UE.

The use of cached IP notifications disclosed herein provides a variety of advantages. When the UE is not connected to the cellular RAN, for example when the UE is receiving wireless coverage from a WiFi AP or is in airplane mode, non-cached IP notifications cannot be sent to the UE from the IP notification server. In this scenario, however, the IP notification application can present one or more IP notifications based on triggering rules related to being out of cellular RAN wireless coverage, thereby avoiding the loss of opportunity of presenting IP notifications. Presenting a cached IP notification when a context of the UE satisfies the triggering rule may result in a higher rate of positive subscriber response to the presentation of the IP notifications. This higher rate of positive subscriber response may provide a higher revenue stream, for example when the IP notifications prompt the subscriber to download and install mobile applications.

Turning now to FIG. 1, a system 100 is described. In an embodiment, the system 100 comprises a user equipment (UE) 102 having a cellular radio transceiver 104 that may be able to establish a wireless communication link to a cell site 106 which communicatively links the UE 102 to a network 108. The UE 102 may further comprise a WiFi radio transceiver 110 that may establish a wireless communication link to a WiFi access point (AP) 112 which communicatively links the UE 102 to the network 108. The UE 102 may further comprise a processor 118, a display 119, and a memory 120. The memory 120 may store an IP notification application 122 and an IP notifications cache 124. The IP notification application 122 may be stored in a non-transitory region of the memory 120. The IP notifications cache 124 may be stored in a non-transitory region of the memory 120.

The UE 102 may be referred to as a mobile communication device. The UE 102 may be a mobile phone, a smart phone, a personal digital assistant (PDA), a media player, a wearable computer, a headset computer, a laptop computer, a notebook computer, or a tablet computer. The cell site 106 may be an enhanced Node B (eNB), a base transceiver station (BTS), a picocell, or other cellular radio access network (RAN) access point. The cell site 106 may provide a cellular wireless communication link to the UE 102 according to at least one of a long-term evolution (LTE), a code division multiple access (CDMA), a global system for mobile communications (GSM), or a worldwide interoperability for microwave access (WiMAX) cellular telecommunication protocol. The system 100 may comprise any number of UEs 102, any number of cell sites 106, and any number of WiFi APs 112. The system 100 may further comprise an IP notification server 130 comprising an IP notification targeting application 132 and one or more targeted IP notification campaigns 134. The system 100 may further comprise an IP notifications data store 136.

The IP notification targeting application 132 may select UEs 102 for receiving an IP notification of one of the targeted IP notification campaigns 134. A targeted IP notification campaign 134 may identify a specific IP notification that is desired to be promulgated to UEs 102 whose associated subscriber satisfies a subscriber targeting profile deemed to select a subscriber who is likely to respond favorably to the subject IP notification. The targeted IP notification campaigns 134 may each define the subscriber targeting profile or a plurality of subscriber targeting profiles for the subject targeted IP notification campaign 134. The subscriber targeting profile may include information such as one or more of a preferred location of the UEs 102 (e.g., location in the mid-West), a preferred age range of the subscribers, a preferred category of the subscribers (e.g., a gamer category, a news follower category, a sports enthusiast category, etc.), a preferred sex of the subscribers, a preferred education level of the subscribers, a preferred income range of the subscribers, a preferred UE model or list of preferred UE models, etc.

The targeted IP notification campaigns 134 may further define how many total IP notifications are to be transmitted by the IP notification server 130 and over what period of time the IP notifications are to be transmitted. The IP notification targeting application 132 may then carryout the targeted IP notification campaigns 134 accordingly. Executing a targeted IP notification campaign 134 may entail sending both non-cached IP notifications and cached IP notifications. Some targeted IP notification campaigns 134 may rely only on non-cached IP notifications and other targeted IP notification campaigns 134 may rely only on cached IP notifications. The IP notification targeting application 132 may limit the number of non-cached IP notifications that it sends to a single UE 102 during a period of time to a predefined number, for example five IP notifications per day. As used herein, non-cached IP notifications refer to IP notifications that are sent to the UE 102 for substantially immediate presentation and are sent without a triggering rule bundled with the IP notification. The IP notification targeting application 132 may limit the number of non-cached IP notifications that it sends to a single UE 102 during a period of time further based on how many cached IP notifications have been presented on the display 119 of the UE 102 during that period of time.

Some of the IP notifications may comprise a message prompting a subscriber to download and install a mobile application on the UE 102. This kind of IP notification may further comprise a reference or uniform resource locator (URL) which can be used to retrieve and download the mobile application. Mobile application developers may pay for the targeted IP notification campaign 134 for their mobile application(s) and may pay based on a rate of installations or on a number of installations. In this business case, the operator of the notification server 130, for example a wireless communication service provider, may design the IP notification targeting application 132 to maximize a revenue stream, for example by maximizing the rate at which subscribers respond favorably to IP notifications sent to the UEs 102. The IP notification targeting application 132 may take the limit on IP notifications presented by a UE 102 per period of time into consideration in maximizing the revenue stream. For further details on targeting IP notifications to UEs, see U.S. patent application Ser. No. 15/332,808, filed Oct. 24, 2016, titled "System and Method of Targeting Internet Protocol (IP) Notifications to Mobile Communication Devices," by Matthew Habiger, et al., which is incorporated by reference herein in its entirety.

The IP notification targeting application 132 may create an IP notification bundle comprising an IP notification and a triggering rule. Alternatively, the targeted IP notification campaign 134 may itself create the IP notification bundle comprising the IP notification and the triggering rule. The IP notification targeting application 132 may then transmit the IP notification bundle to one or more UEs 102 that satisfies the subscriber targeting profile. An IP notification that is associated with a triggering rule and/or is included in an IP notification bundle may be referred to as a cached IP notification. The IP notification targeting application 132 may send the IP notification bundle to the UE 102, for example, via the network 108, via the cell site 106, via a cellular wireless link to the cellular radio transceiver 104.

The IP notification application 122 may receive the IP notification bundle, store the IP notification contained by the IP notification bundle in the IP notifications cache 124, and incorporate the triggering rule contained by the IP notification bundle into the IP notification application 122, for example into a dynamic memory region associated with the application 122 or into a non-transitory area of the memory 120. The IP notification application 122 iteratively monitors the context of the UE 102 and evaluates triggering rules associated with each of the IP notifications it has stored in the IP notifications cache 124. When a triggering rule is evaluated true by the IP notification application 122 (e.g., the IP notification application 122 determines that the current context of the UE 102 satisfies the triggering rule), the IP notification application 122 retrieves the IP notification associated with the subject triggering rule from the IP notifications cache 124 and presents the IP notification on the display 119. For example, the IP notification application 122 causes the IP notification retrieved from the IP notifications cache 124 to be presented in a notifications screen of the display 119. The IP notification application 122 may iteratively evaluate all triggering rules periodically, for example once every minute, once every five minutes, once every fifteen minutes, or at some other periodic rate. Alternatively the IP notification application 122 may iteratively evaluate all triggering rules as one or more events occurs, for example each time the screen of the UE 102 is unlocked, each time a user changes screen, or based on some other event or events.

When the IP notification application 122 presents a cached IP notification (e.g., an IP notification retrieved from the IP notifications cache 124 on the event of the associated triggering rule evaluating true) it may create a message or log of this presentation of the cached IP notification and transmit this message to the IP notification targeting application 132 executing on the IP notification server 130. The message may identify the UE 102 and/or a subscriber associated with the UE 102, the cached IP notification that was presented, and optionally information about the current state and/or context of the UE 102. The IP notification targeting application 132 may use the message or log to advance the count of IP notifications presented on the UE 102 during the current period of time to promote restricting the number of IP notifications—the total of non-cached IP notifications and cached IP notifications—presented on the UE 102 per period of time.

In an embodiment, the IP notification application 122 may discard an IP notification stored in the IP notifications cache 124 and delete the associated triggering rule from memory 120 (e.g., from dynamic memory region associated with the IP notification application 122 or from a region of non-transitory memory) after the subject IP notification exceeds a predefined age. This age limit may be provided in the triggering rule or may be provided separately in the IP notification bundle. When the IP notification application 122 ages out and discards an IP notification, it may also create a message or log documenting this event and send the message or log to the IP notification targeting application 132. The IP notification targeting application 132 may respond to this aging out message by locating a different IP notification bundle and sending that to the IP notification application 122.

The IP notification targeting application 132 may further respond to this aging out message by adapting the triggering rule associated with the subject IP notification bundle so that when the same IP notification bundle is sent to other UEs 102 in the future they may receive the benefit of this triggering rule adaptation. The adaptation of the triggering rule may be initiated based on the aging out of the cached IP notification on a plurality of UEs 102, for example 10, 50, 100, or 1000 UEs 102. In an embodiment, after the IP notification application 122 presents a cached IP notification on the UE 102, the IP notification application 122 removes the IP notification from the IP notifications cache 124 and discards the triggering rule associated with that IP notification.

One of the triggering rules may specify that an IP notification be presented on the display 119 when the UE 102 loses its wireless link with the cell site 106, for example when it is out of coverage, when the UE 102 switches to employ the WiFi wireless communication link with the WiFi AP 112 by preference to the cellular wireless communication link with the cell site 106, or when the UE 102 enters an airplane mode of operation. This kind of rule may be useful to promote presenting cached IP notifications even when the UE 102 is not reachable from the cellular network. Without the use of cached IP notifications in this scenario, revenue opportunities may be undesirably missed.

The use of cached IP notifications can promote presentation of IP notifications on the display 119 at a time when the subscriber is likely to be more responsive to the IP notification than at another time. For example, if the subscriber usually follows a commute path A to drive to work but occasionally follows a commute path B to drive to work, triggering presentation on the display 119 of a cached IP notification on the day the subscriber follows commute path B which passes near a retail venue associated with the cached IP notification may increase the probability of a favorable response to the presented IP notification by that subscriber. Alternatively, a triggering rule may identify a specific WiFi AP 112 station identity such that a cached IP notification is presented on display 119 of the UE 102 when the WiFi AP 112 station identity is detected by the WiFi radio transceiver 110. This may promote presenting a notification promoting a specific mobile application associated with a retail venue where the WiFi AP 112 having the station identity is located. Alternatively, a triggering rule could be based on detecting a radio beacon having a specific identity and presenting an IP notification when that radio beacon is detected, hence triggering when the UE 102 is at the location associated to the subject radio beacon.

Figure 2:
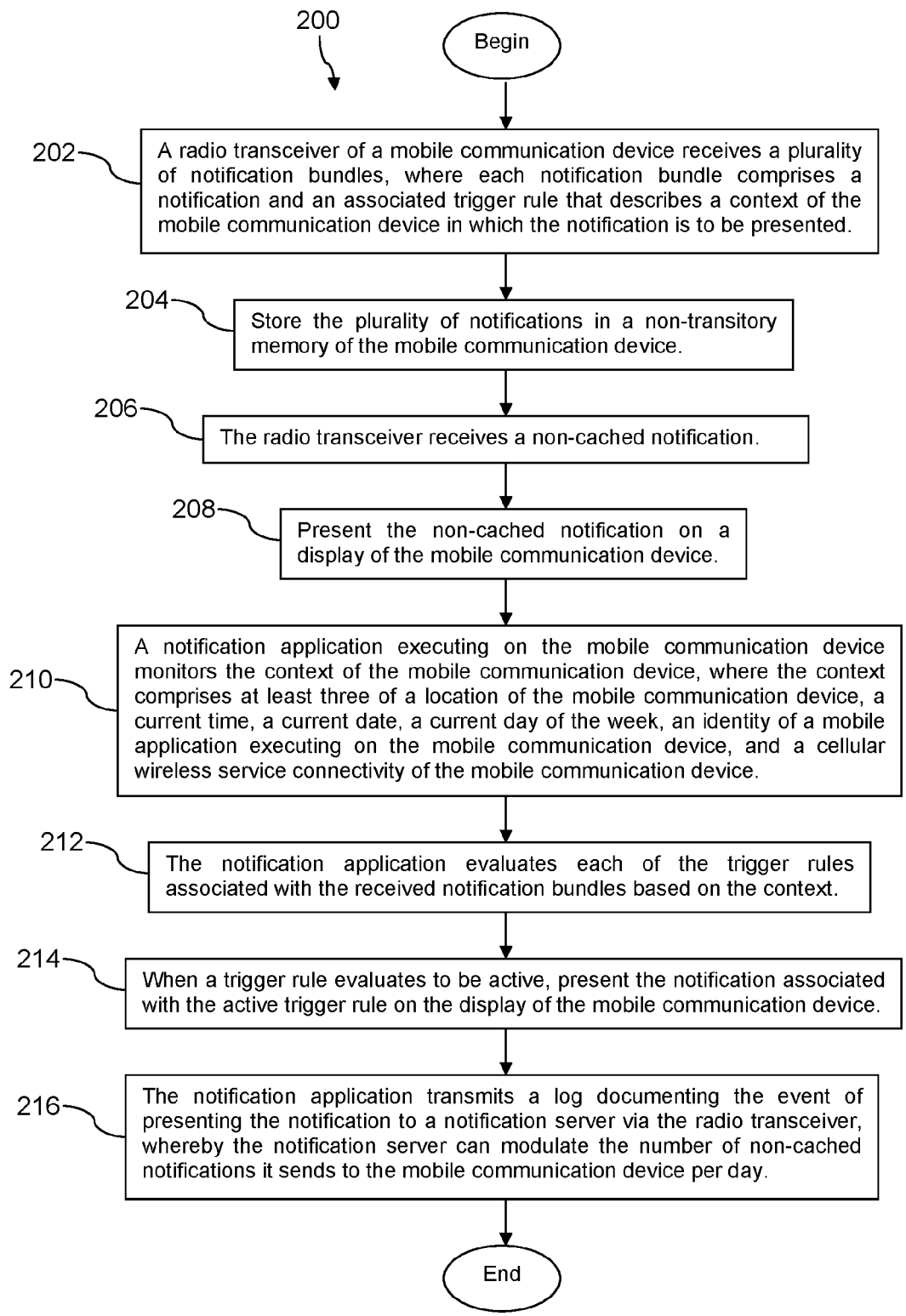
FIG. 2 is a flow chart of a method according to an embodiment of the disclosure.

Turning now to FIG. 2, a method 200 is described. The method 200 may be performed, for example, by the UE 102 described above. At block 202, a radio transceiver of a mobile communication device (e.g., the UE 102) receives a plurality of notification bundles, where each notification bundle comprises a notification and an associated trigger rule that describes a context of the mobile communication device in which the notification is to be presented. The notifications may be IP notifications and the notification bundles may be IP notification bundles. At block 204, store the plurality of notifications in a non-transitory memory of the mobile communication device. At block 206, the radio transceiver receives a non-cached notification. For example, the radio transceiver may receive the non-cached notification from the notification server 130. At block 208, present the non-cached notification on a display of the mobile communication device. In an embodiment, the non-cached notification may be presented in a notifications screen which is hidden until a user opens the notifications screen—for example by pulling down the notifications screen from the top of a touchscreen display or by selecting a notifications screen icon.

At block 210, a notification application executing on the mobile communication device monitors the context of the mobile communication device, where the context comprises at least three of a location of the mobile communication device, a current time, a current date, a current day of the week, an identity of a mobile application executing on the mobile communication device, and a cellular wireless service connectivity of the mobile communication device. At block 212, the notification application evaluates each of the trigger rules associated with the received notification bundles based on the context. At block 214, when a trigger rule evaluates to be active, present the notification associated with the active trigger rule on the display of the mobile communication device. At block 216, the notification application transmits a log documenting the event of presenting the notification to a notification server via the radio transceiver, whereby the notification server can modulate the number of non-cached notifications it sends to the mobile communication device per day.

Figure 3:
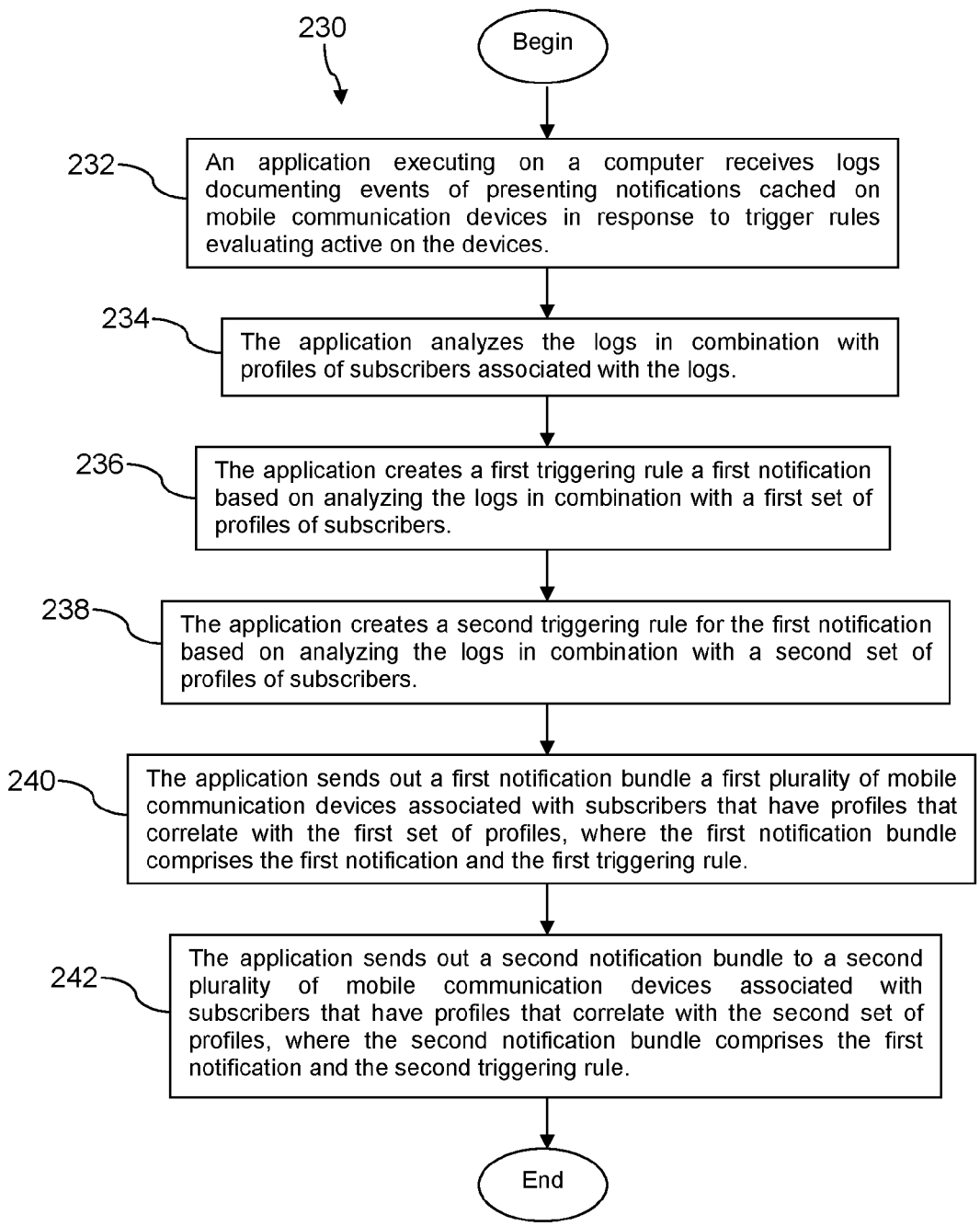
FIG. 3 is a flow chart of another method according to an embodiment of the disclosure.

Turning now to FIG. 3, a method 230 is described. Method 230 may be executed by the IP notification server 130 described above. At block 232, an application executing on a computer receives logs documenting events of presenting notifications cached on mobile communication devices in response to trigger rules evaluating active on the devices. At block 234, the application analyzes the logs in combination with profiles of subscribers associated with the logs. At block 236, the application creates a first triggering rule a first notification based on analyzing the logs in combination with a first set of profiles of subscribers At block 238, the application creates a second triggering rule for the first notification based on analyzing the logs in combination with a second set of profiles of subscribers. At block 240, the application sends out a first notification bundle a first plurality of mobile communication devices associated with subscribers that have profiles that correlate with the first set of profiles, where the first notification bundle comprises the first notification and the first triggering rule. The first set of profiles and the second set of profiles may be distinguished from each other in a variety of ways. The first set of profiles may be profiles associated with male subscribers and the second set of profiles may be profiles associated with female subscribers. The first set of profiles may be profiles associated with subscribers belonging to a first age group and the second set of profiles may be profiles associated with subscribers belonging to a second age group, where the first age group and second age group are non-overlapping in age. The first set of profiles may be profiles associated with subscribers having a mobile device of a first platform type (e.g., iOS devices) and the second set of profiles may be profiles associated with subscribers having a mobile device of a second platform type (e.g., Android devices).

At block 242, the application sends out a second notification bundle to a second plurality of mobile communication devices associated with subscribers that have profiles that correlate with the second set of profiles, where the second notification bundle comprises the first notification and the second triggering rule.

Figure 4:
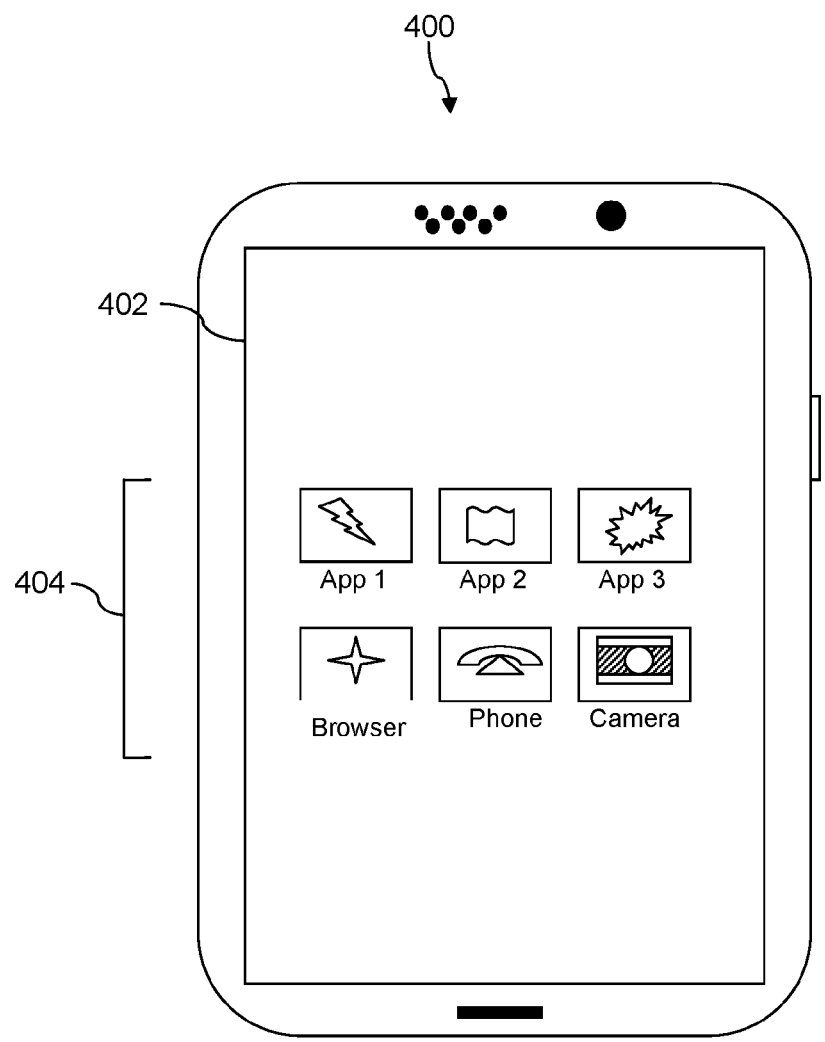
FIG. 4 is an illustration of a mobile communication device according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
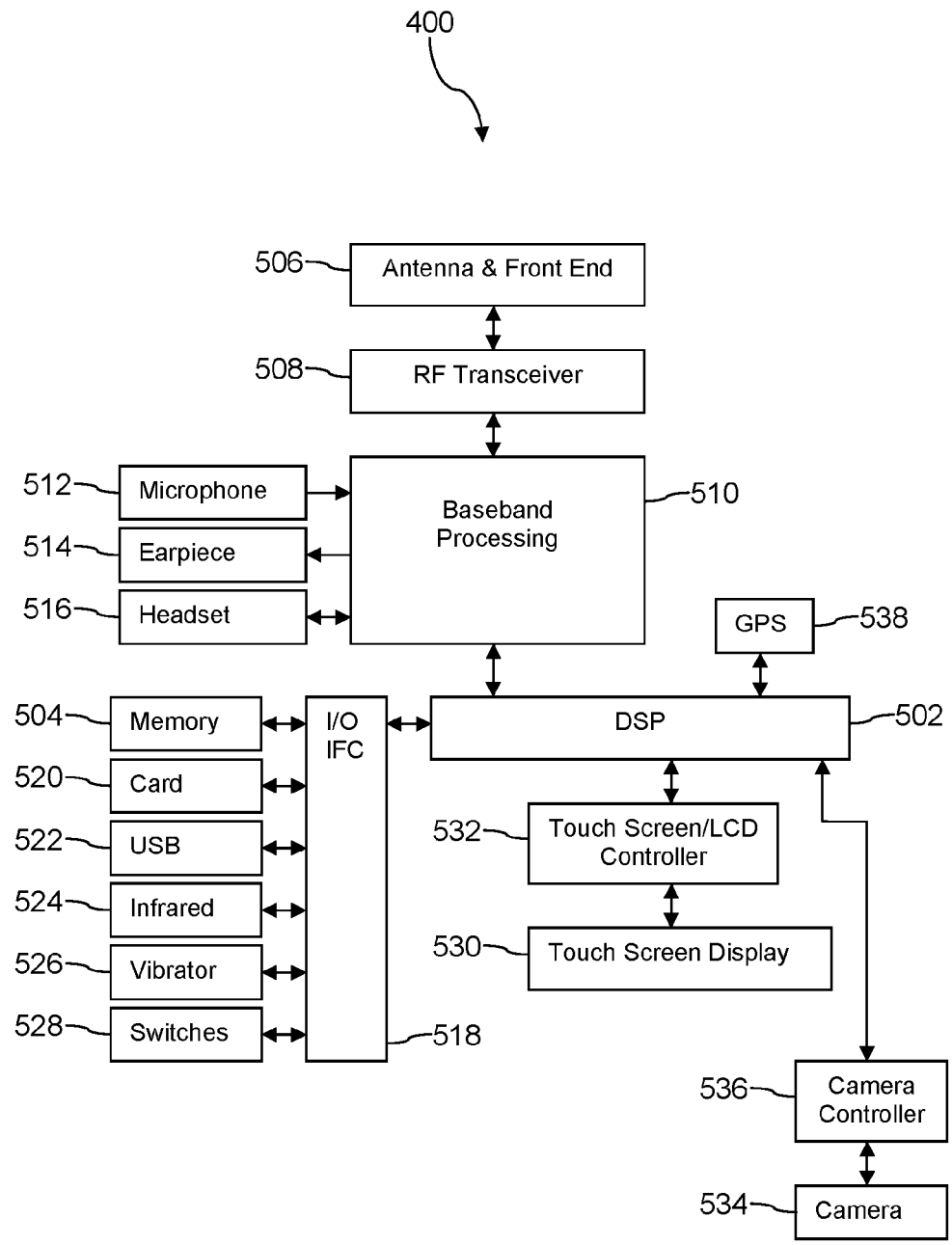
FIG. 5 is a block diagram of a hardware architecture of a mobile communication device according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
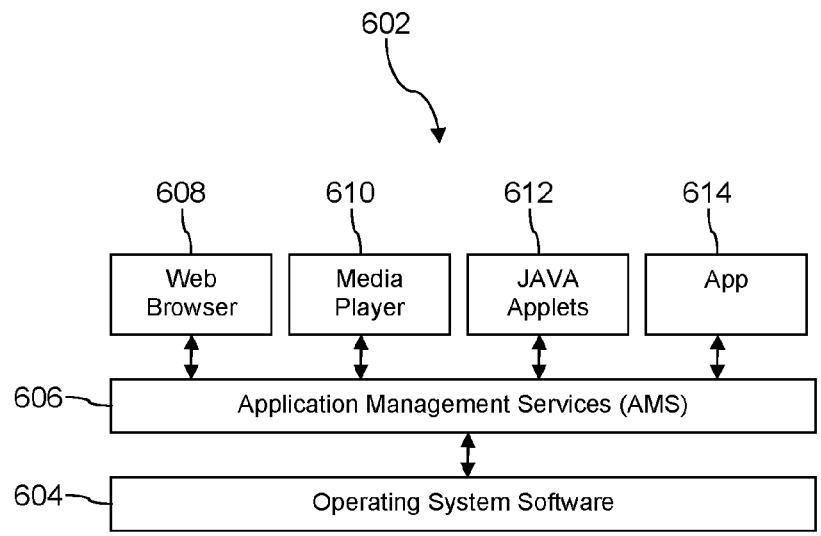
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. In an embodiment, a third party application 614 may be installed on the mobile communication device 400. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

The third party application 614 may be dynamically downloaded and installed during a first time that the mobile communication device 400 enters a retail store (e.g., any of a plurality of retails stores associated with a particular enterprise) and may be activated on subsequent entries into a retail store. Alternatively, the third party application 614 may be installed in another way (e.g., the user elects to install the application 614, for example to obtain coupons or other desirable features provided via the application 614).

Figure 6B:
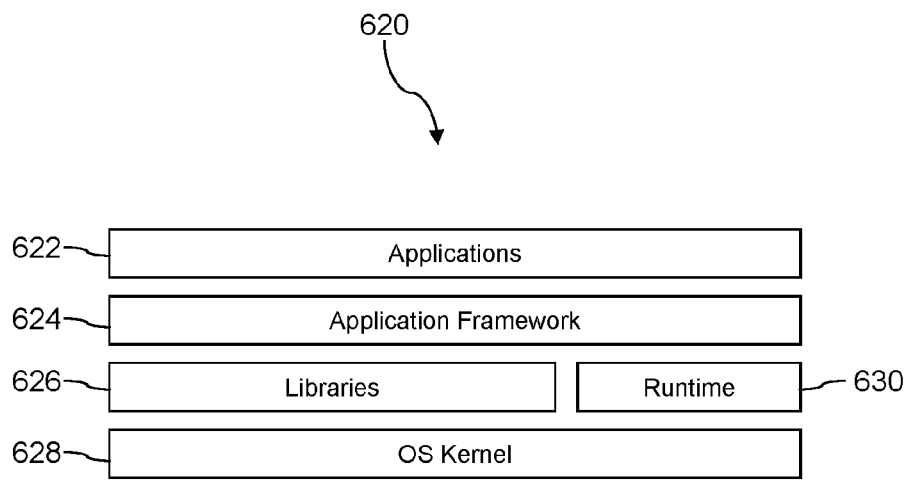
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
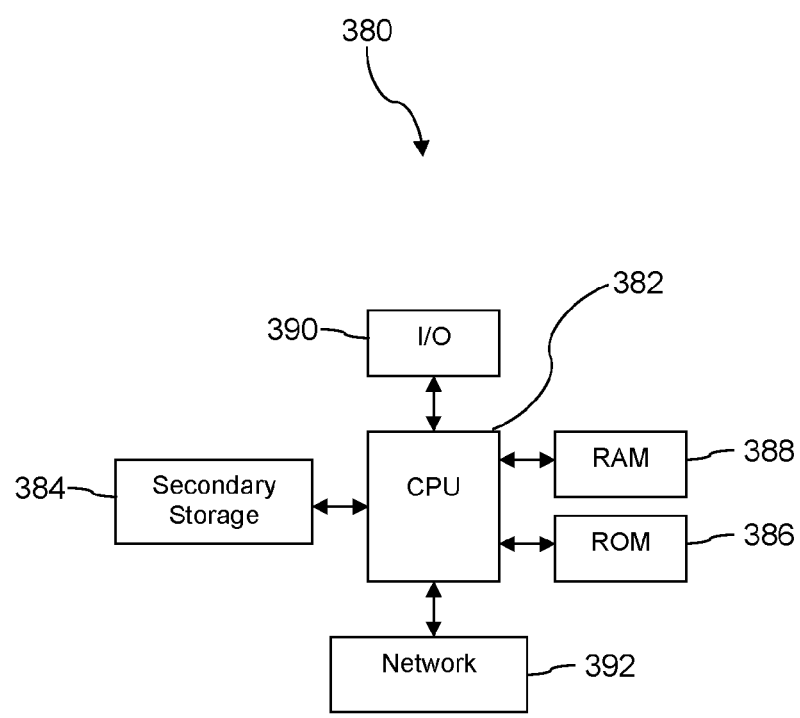
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388.

In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of presenting notifications on a mobile communication device, comprising:
   receiving a plurality of Internet protocol (IP) notification bundles by a radio transceiver of the mobile communication device, where each notification bundle comprises an IP notification and an associated trigger rule that describes a context of the mobile communication device in which the IP notification is to be presented;
   caching the IP notification from each of the plurality of IP notification bundles in a non-transitory memory of the mobile communication device;
   receiving a non-cached IP notification via the radio transceiver;
   presenting the non-cached IP notification on a display of the mobile communication device;
   after receiving the plurality of IP notification bundles and caching each IP notification:
      monitoring the context of the mobile communication device by a notification application executing on the mobile communication device, where the context comprises at least three of a location of the mobile communication device, a current time, a current date, a current day of the week, an identity of a mobile application executing on the mobile communication device, and a cellular wireless service connectivity of the mobile communication device;
      evaluating each of the trigger rules associated with the received plurality of IP notification bundles by the notification application based on the context;
      when a trigger rule evaluates to be active, presenting the cached IP notification associated with the active trigger rule on the display of the mobile communication device; and
      transmitting a log documenting the presentation of the cached IP notification by the notification application to a notification server via the radio transceiver, whereby the notification server can modulate the number of non-cached IP notifications it sends to the mobile communication device per day.

2. The method of claim 1, wherein the mobile communication device is one of a mobile phone, a smart phone, a personal digital assistant (PDA), a media player, a wearable computer, a headset computer, a laptop computer, a tablet computer, or a notebook computer.

3. The method of claim 1, wherein the radio transceiver of the mobile communication device receives the plurality of notification IP bundles over a cellular wireless communication link according to one of a long-term evolution (LTE), a code division multiple access (CDMA), a global system for mobile communications (GSM), or a worldwide interoperability for microwave access (WiMAX) telecommunication protocol.

4. The method of claim 1, wherein the trigger rules associated with the received plurality of IP notification bundles are evaluated by the notification application periodically.

5. The method of claim 1, wherein the trigger rules associated with the received plurality of IP notification bundles are evaluated in response to a screen of the mobile communication device being unlocked and to a change of screen of the mobile communication device.

6. The method of claim 1, wherein the context of the mobile communication device further comprises a number of times during a predefined period of time IP notifications have been presented on the display of the mobile communication device.

7. The method of claim 6, wherein all trigger rules are defined to evaluate inactive when the context indicates that the number of times a cached IP notification has been presented during the current predefined period of time is at a predefined limit.

8. The method of claim 6, wherein when the context indicates that the number of times a cached IP notification has been presented during the current predefined period of time is at the predefined limit, the notification application discontinues evaluating trigger rules, whereby cached IP notifications stored in the non-transitory memory of the mobile communication device are prevented from being presented during the remainder of the current predefined period of time.

9. A method of sending notifications to mobile communication devices, each of the steps of the method performed by an application executing on a computer, the method comprising:

receiving logs documenting events of presenting Internet protocol (IP) notifications cached on mobile communication devices in response to trigger rules evaluating active on the devices;

analyzing the logs in combination with profiles of subscribers associated with the logs;

creating a first triggering rule for a first IP notification based on analyzing the logs in combination with a first set of profiles of subscribers;

creating a second triggering rule for the first IP notification based on analyzing the logs in combination with a second set of profiles of subscribers;

sending out a first IP notification bundle to a first plurality of mobile communication devices associated with subscribers that have profiles that correlate with the first set of profiles, where the first IP notification bundle comprises the first IP notification and the first triggering rule, wherein the first IP notification is cached on each of the first plurality of mobile communication devices and the cached first IP notification is subsequently displayed upon triggering of the second triggering rule based on a context of each of the first plurality of mobile communication devices monitored by a notification application on each of the first plurality of mobile communication devices, and wherein the context comprises at least three of a location of a corresponding mobile communication device, a current time, a current date, a current day of the week, an identity of a mobile application executing on the corresponding mobile communication device, and a cellular wireless service connectivity of the corresponding mobile communication device;

sending out a second IP notification bundle to a second plurality of mobile communication devices associated with subscribers that have profiles that correlate with the second set of profiles, where the second IP notification bundle comprises the first IP notification and the second triggering rule, wherein the first IP notification is cached on each of the second plurality of mobile communication devices and the cached first IP notification is subsequently displayed upon triggering of the second triggering rule based on the context of each of the second plurality of mobile communication devices monitored by a notification application on each of the second plurality of mobile communication devices; and sending one or more non-cached IP notifications to the first plurality of mobile communication devices and the second plurality of mobile devices for display on the first plurality of mobile communication devices and the second plurality of mobile communication devices.

10. The method of claim 9, wherein the first triggering rule incorporates a first aging out provision and the second triggering rule incorporates a second aging out provision that is different from the first aging out provision, where aging out provisions identify an age at which the first IP notification cached on a mobile communication device is to be deleted.

11. The method of claim 9, wherein the first set of profiles of subscribers identify a male sex and the second set of profiles of subscribers identify a female sex.

12. The method of claim 9, wherein the first and second pluralities of mobile communication devices comprise one or more of a mobile phone, a smart phone, a personal digital assistant (PDA), a media player, a wearable computer, a headset computer, a laptop computer, a tablet computer, or a notebook computer.

13. A mobile communication device, comprising:
a radio transceiver;
a display;
a non-transitory memory;
a processor; and
a notification application stored in the non-transitory memory that, when executed by the processor:
receives a plurality of Internet protocol (IP) notification bundles via the radio transceiver, where each IP notification bundle comprises an IP notification and a trigger rule and each IP notification comprises a prompt to download and install a mobile application on the mobile communication device,
caches the IP notification from each of the plurality of IP notification bundles in the non-transitory memory,
receives a non-cached IP notification via the radio transceiver,
presents the non-cached IP notification on the display,
after receiving the plurality of IP notification bundles and caching each IP notification:
monitors a context of the mobile communication device, wherein the context comprises at least three of a location of the mobile communication device, a current time, a current date, a current day of the week, an identity of a mobile application executing on the mobile communication device, and a cellular wireless service connectivity of the mobile communication device,
evaluates each of the trigger rules of the plurality of IP notification bundles based on monitoring the context of the mobile communication device,
when a trigger rule evaluates to be active, presents the cached IP notification associated with the active trigger rule on the display, and
transmits a log documenting the presentation of the cached IP notification to a notification server via the radio transceiver.

14. The mobile communication device of claim 13, wherein the mobile communication device is one of a mobile phone, a smart phone, a personal digital assistant (PDA), a media player, a wearable computer, a headset computer, a laptop computer, a tablet computer, or a notebook computer.

15. The mobile communication device of claim 13, wherein the notification application further evaluates the age of IP notifications stored in the non-transitory memory and deletes an IP notification stored in the non-transitory memory that exceeds a predefined age of the IP notification.

16. The mobile communication device of claim 15, wherein the predefined age of the IP notification is incorporated in the trigger rule associated with the IP notification.

17. The mobile communication device of claim 15, wherein after the notification application deletes the IP notification, the notification application sends a log documenting the deletion of the IP notification to the notification server via the radio transceiver.

18. The mobile communication device of claim 13, wherein after the IP notification associated with the active trigger rule is presented on the display, the notification application deletes the IP notification from the non-transitory memory.

* * * * *